Figures 1, 2:
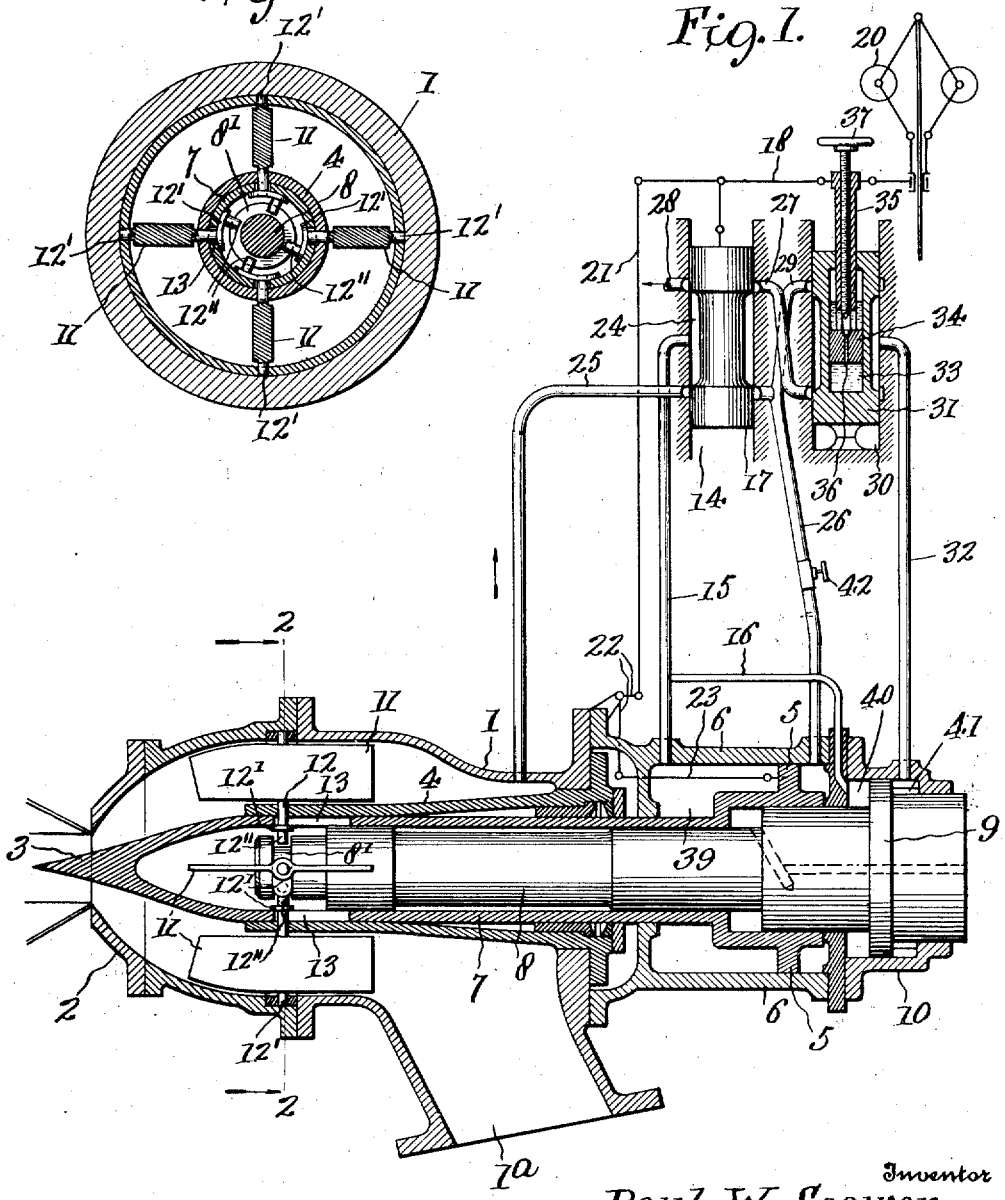

P. W. SEEWER.

DEVICE FOR GOVERNING WATER WHEELS.

APPLICATION FILED JULY 26, 1920.

Reissued Oct. 19, 1920. 14,962.

Inventor

Paul W. Seewer.

Witness

Edwin J. Beller.

By Wilkinson & Gusta,

Attorneys

UNITED STATES PATENT OFFICE.

PAUL W. SEEWER, OF NEW MALDEN, ENGLAND.

DEVICE FOR GOVERNING WATER-WHEELS.

14,962. Specification of Reissued Letters Patent. Reissued Oct. 19, 1920.

Original No. 1,282,470, dated October 22, 1918, Serial No. 117,686, filed August 30, 1916. Application for reissue filed July 26, 1920. Serial No. 399,193.

*To all whom it may concern:*

Be it known that I, PAUL W. SEEWER, a citizen of the Swiss Confederation, and lately a resident of the city of Geneva, Switzerland, now residing at Bracknell, Lynton Road, New Malden, Surrey, England, have invented a new and Improved Device for Governing Water-Wheels, of which the following is a full, clear, and exact description.

The present invention relates to a governing device for tangential water wheels, pelton wheels and so on.

The main object of the invention is to control the working of the water wheel by varying the direction of movement of the particles of water constituting the water jet issuing from the nozzle.

I attain this object by arranging within the nozzle movably arranged guide vanes which may be moved into or within the water current in the nozzle in such a manner that either a solid jet leaves the nozzle or a jet which is totally split up in such a way that the issuing water cannot act on the wheel, or a jet in an intermediate stage between these two conditions.

In a preferred form of construction, I arrange a centrifugal governor which controls the guide vanes, said governor being connected with the vanes by a suitable transmission gear, fluid relays and so on, which governor moreover controls the axial movement of a needle arranged in a nozzle, the axial displacement of which is used for varying the size of the jet. The action of the guide vanes may be suitably combined with that of the needle, so that in case of emergency the guide vanes are rapidly turned across the water current and impart a whirling motion thereto in such a manner that a nozzle delivers a jet wholly split up and unable to impinge upon the vanes. The water wheel is thus prevented from racing in a rapid manner and by simple means.

The present invention also comprises other features which will appear in the course of the subjoined description.

Reference is had to the accompanying drawings, in which:

Figure 1 shows a central section through the apparatus comprising my invention, parts being shown in full lines, and the mechanism constituting the "cataract" being shown diagrammatically, and Fig. 2 shows a section along the line 2—2 of Fig. 1, and looking in the direction of the arrows.

In the drawings, 1 designates a casing which is connected to a main as at $1^a$. The casing 1 is provided with a nozzle 2 within which a needle 3 is arranged. The needle 3 is movably arranged in a sleeve 4 fixed in the casing 1 concentrically to the nozzle 2. The front end of the needle 3 is tapering and formed in the usual manner so that it may close the orifice of the nozzle 2. The rear end of the needle 3 is provided with an annular flange 5 working as a piston in a cylinder 6 attached to the casing 1. The body portion 7 of the needle is hollow and contains the rod 8 of a piston 9 which works in a second cylinder 10.

Between the sleeve 4 and the casing 1, guide vanes 11 are rotatably mounted. Each vane 11 is provided with a stud 12 projecting through a slot 13 of the hollow shaft 7.

It will be noted that each of the studs 12 of the vanes 11 is provided at its inner end with an outwardly extending lever 12′, to the outer end of which a short stud 12″ is secured, which engages in a groove 8′ formed near the end of the rod 8, which moves with the piston 9. It will thus be seen that when the piston 9 is moved in its axial direction, the vanes 11 are turned around the axes of their studs in such a manner that these vanes, which normally run parallel to the axis of the nozzle 2, form an angle therewith. The jet issuing from the nozzle is split up more or less, and a whirling motion imparted thereto to an extent dependent on the angle made by the vanes 11 with the axis of the nozzle.

The cylinder 6 is connected to a distributing valve chamber 14 by means of the pipe 15; and the pipe 15 is connected by the pipe 16 to one end of the cylinder 10.

Within the valve chamber 14 a piston-valve 17 is slidably mounted, which is linked to a lever 18. The lever 18 is connected at one end to the sleeve of a centrifugal governor 20 and at the other end to a rod 21 linked to a bell crank lever 22. The lever 22 is by means of a rod 23 linked to the piston 5.

The piston-valve 17, which is provided with a channel 24, controls the annular ports into which open the pipes 25, 26 and 27, and the outlet opening 28. The pipes 25, 26, with their annular port connect the interior of the casing 1 to the cylinder 6. A branch 29 of the pipe 26 leads to an annular port in a second valve chamber 30 having a piston-valve 31. The latter controls the ports of the pipes 27, 29 and 32, the latter of which leads from the valve chamber 30 to the cylinder 10. The piston-valve 31 is provided with a chamber 33 in which a piston 34 is slidably arranged. The piston 34 is fixed to a rod 35 connected to the lever 18. The chamber 33 is filled with oil and the piston 34 is provided with a bore 36 which may be partly or wholly closed by a screw 37, constituting a needle valve.

It will be seen that the parts 34, 35, 36, 37, together with the valve 31 in which they work constitute what is known as a "cataract" that is to say, a mechanism whereby if the rod 35 is lifted quickly by the governor 20 it will carry the piston valve 31 with it, but a slow lifting movement will allow the oil in the chamber 30 to leak through the orifice and the valve 31 will remain in its lowermost position owing to its weight.

The device works as follows:—

In the normal position with full load on, the needle 3 is withdrawn from the nozzle 2 and the guide vanes stand parallel to the axis of the needle 3, as shown in the drawings. If now the speed of the governor 20 increases slowly, as due to a slowly decreasing load, the piston-valve 31 will not be moved at all, as the oil in the chamber 33 has sufficient time to flow from one side of the piston 34 to the other through the opening 36. The pressure on both sides of the piston 9 does not change and the piston 9 and therewith the guide vanes 11 remain stationary. The piston-valve 17 however is raised to such a position that the pipes 15 and 28 communicate. The pressure in the part 39 of the cylinder 10 falls, and the piston 5 is moved toward the nozzle 2, thus causing the needle 3 to throttle the discharge through said nozzle. The piston 5 presses the fluid out of the chamber 39 through the conduits 15, 24 to the outflow pipe 28. As soon as piston 5 starts the lever arrangement 23, 22, 21, 18 is set in motion whereby the piston-valve 17 is brought back to its initial position cutting off the communication between the pipes 15 and 28.

If due to an increasing load the governor 20 falls the piston-valve 31 is again not moved at all and only the piston-valve 17 is lowered. The pipe 25 is put in communication with pipe 15 and the pressure in chamber 39 rises. The piston 5 and therewith the needle 3 moves backwardly and the nozzle is opened. The piston-valve 17 is brought back to its initial point by the mechanism 18, 21, 22 and 23 in the well known manner.

If the governor rises quickly, the oil in the chamber 33 can not pass from one side of the piston to the other and the rising piston 34 being coupled by the oil with the piston-valve 31 takes the latter with it. At the same time the piston-valve 17 is going upward. The pressure on the two sides of the piston 9 is now changed. The fluid from the part 40 of the cylinder 10 escapes through the conduits 16, 15, 24, 28 and pressure fluid enters into the cylinder part 41 through the conduits 25, 29 and 32. The piston 9 is rapidly moved and moves thereby the guide vanes 11. The movement of the vanes 11 causes the splitting up of the jet issuing from the nozzle 2 which jet is solid as long as the vanes 11 are parallel to the axis of the needle 3. A sufficient deflecting of the vanes 11 will prevent the jet from doing any work. At the same time that the vanes 11 are moved, the needle 3 is moved as above described and may ultimately close the nozzle 2. The speed of its regulating action may be chosen according to requirements; to vary the regulating speed a valve 42 may be inserted in the pipe 26. During the operation of setting the vanes 11, the oil in chamber 33 will flow from one side of the piston 34 to the other, the piston-valve 31 pressing downwardly owing to its weight. By the motion of piston 5 the piston-valve 17 and piston 34 are brought back to their original positions, and upon return of piston-valve 31 to its initial position, the piston 9 is brought back setting the vanes 11 parallel to the flow of the water through the nozzle 2. The ports and valves are constructed and arranged to permit the return of piston 9 to the right. The energy required for the regulation is very small, the speed of regulation in emergency cases is very great, without causing a dangerous increase in the pressure of the mains, as the closing of the nozzle by means of the needle may be made as slow as desired. Although I have described one form of construction I wish it clearly understood that I do not confine my invention to the particular form of the device as shown and described. Various changes may be made without departing from the spirit of my invention.

In the following claims the word relay, when used, is intended to cover a hydraulic arrangement comprising a main valve, a motor element moving the same, and a pilot valve to control the motor element.

What I claim as my invention and desire to secure by Letters Patent is:—

1. In a governing device for water wheels, the combination of a nozzle, vane-like guiding means disposed within the nozzle and operative means for causing the said guiding means to impart whirling motion to the water passing through the nozzle when required.

2. In a governing device for water wheels the combination of a nozzle, vane-like guiding means within the nozzle movable relatively to the nozzle orifice so as to impart when desired a whirling motion to the water, and means to impart said relative movement when required.

3. In a governing device for water wheels the combination of a nozzle, vane-like guiding means within the nozzle movable relatively to the nozzle orifice so as to impart when desired a whirling motion to the water, a governor actuated by the water wheel, and operative connections between the governor and the said guiding means.

4. In a governor device for water wheels the combination of a nozzle, vane-like guiding means within the nozzle movable relatively to the nozzle orifice so as to impart when desired a whirling motion to the water, a needle for controlling the flow of the water, two fluid-pressure relays, one for operating the guiding means and the other for operating the needle, and a governor actuated by the water wheel which operates the control-valves of both the fluid pressure relays.

5. In a governor device for water wheels, the combination of a nozzle, vane-like guiding means within the nozzle movable relatively to the nozzle orifice so as to impart when desired a whirling motion to the water, a needle for controlling the flow of the water, two fluid-pressure relays, one for operating the guiding means and the other for operating the needle, a governor actuated by the water wheel which operates the control-valves of both the fluid pressure relays, and a "cataract" interposed in the operative connections of the governor with the relay which operates the guiding means.

6. In a governor device for water wheels, the combination of a nozzle, vane-like guiding means within the nozzle movable relatively to the nozzle orifice so as to impart when desired a whirling motion to the water, a needle for controlling the flow of the water, two fluid-pressure relays, one for operating the guiding means and the other for operating the needle, a governor actuated by the water-wheel which operates the control valves of both the fluid pressure relays, a "cataract" interposed in the operative connections of the governor with the relay which operates the guiding means, and a constricting device in the pipe connections of the needle relay to retard its movements.

7. In a governing device for water wheels the combination of a nozzle, a plurality of guide vanes radially disposed around the interior of the nozzle and normally lying in planes including the axis of the nozzle but adapted to be deflected relative to said nozzle when desired to impart a whirling motion to the water, and means for imparting said deflecting movement to the guide vanes.

8. In a governing device for water wheels the combination of a nozzle, a plurality of guide vanes radially disposed around the interior of the nozzle and normally lying in one plane with the axis of nozzle but adapted to be deflected relative to said nozzle when desired to impart a whirling motion to the water, a governor actuated by the water wheel, and operative connections between the governor and the said vanes.

9. In a governing device for water wheels the combination of a nozzle, a needle disposed centrally and axially of said nozzle, a plurality of guide vanes radially disposed in the annular space between said needle and said nozzle and pivoted on axes at right angles to the axis of the nozzle, and means for deflecting said vanes relatively to said nozzle and needle when desired into position oblique to the normal lines of flow of the water.

10. In a governing device for water wheels the combination of a nozzle, a needle disposed centrally and axially of said nozzle, a plurality of guide vanes radially disposed in the annular space between said needle and said nozzle, and pivoted on axes at right angles to the axis of the nozzle, means for deflecting said vanes relatively to said nozzle and needle when desired into position oblique to the normal lines of flow of the water, a governor actuated by the water wheel, and operative connections between the governor and the said means for deflecting the vanes.

11. In a governing device for water wheels having a nozzle, movable guide vanes adapted to be set parallel to or across the axis of the nozzle, means for adjusting the orifice of the nozzle, as desired, a motor element on said first named means for causing its movement, a piston within said motor element for causing the movement of said guide vanes, fluid relays controlling said motor element and said piston, and means for controlling said fluid relays, substantially as described.

12. In a governing device for water wheels having a nozzle, movable guide vanes adapted to be set parallel to or across the axis of the nozzle as desired, a needle adapted to adjust the orifice of the nozzle, a hollow piston on said needle controlling the movement thereof, a second piston arranged within the first named piston controlling the movement of the guide vanes, fluid relays controlling said pistons and a governor controlling said fluid relays, substantially as described.

13. In a governing device for water wheels having a nozzle, deflecting vanes adapted to be set parallel to or across the axis of the nozzle as desired, a needle adapted to adjust the orifice of the nozzle, a hollow piston on said needle and controlling the movements thereof, a second piston arranged within the first named piston and adapted to actuate said deflecting vanes, fluid relays controlling said pistons, and a governor controlling said fluid relays, substantially as described.

P. W. SEEWER.